United States Patent
Ogawa et al.

(10) Patent No.: US 8,168,704 B2
(45) Date of Patent: May 1, 2012

(54) ADHESIVE COMPOSITION AND OPTICAL MEMBER INCLUDING THE SAME

(75) Inventors: Hiroshi Ogawa, Kanagawa (JP); Tatsuhiro Suwa, Kanagawa (JP); Cheong Hun Song, Seoul (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 868 days.

(21) Appl. No.: 12/222,563

(22) Filed: Aug. 12, 2008

(65) Prior Publication Data

US 2009/0053519 A1 Feb. 26, 2009

(30) Foreign Application Priority Data

Aug. 14, 2007 (JP) .................................. 2007-211538
Aug. 14, 2007 (JP) .................................. 2007-211539

(51) Int. Cl.
*B32B 33/00* (2006.01)
*C08K 5/3415* (2006.01)

(52) U.S. Cl. .......... 524/81; 524/104; 524/106; 524/145; 524/156; 524/99; 524/551; 524/544; 524/180; 524/399

(58) Field of Classification Search ..................... 524/81, 524/104, 106, 145, 156, 99, 551, 544, 180, 524/399
See application file for complete search history.

(56) References Cited

U.S. PATENT DOCUMENTS

2011/0123774 A1* 5/2011 Matsui et al. ................. 428/172
* cited by examiner

*Primary Examiner* — Robert D. Harlan
(74) *Attorney, Agent, or Firm* — Lee & Morse, P.C.

(57) ABSTRACT

An adhesive composition includes a base polymer, the base polymer including a copolymer having at least one (meth) acrylic ester with a halogen element and at least one (meth) acrylate in a copolymeric unit, and an antistatic agent, the antistatic agent including an ionic compound.

13 Claims, No Drawings

ADHESIVE COMPOSITION AND OPTICAL MEMBER INCLUDING THE SAME

BACKGROUND OF THE INVENTION

1. Field of the Invention

Example embodiments relate to an adhesive composition and to an optical member including the same. More particularly, example embodiments relate to an adhesive composition exhibiting antistatic properties and to an optical member including the same.

2. Description of the Related Art

Flat panel displays may include functional films, e.g., optical films, for improved display properties. For example, a flat panel display may include optical films bonded together by adhesive layers. The conventional optical films may impart optical properties to the flat panel display, e.g., may include release films and/or surface protection films in order to prevent scratches to and/or contamination of the flat panel display. The conventional flat panel display, however, may require an element for reducing static thereon, e.g., electrostatic surface discharge, in order to improve further display properties, e.g., minimize dust adhesion to the flat panel display, minimize effect on display circuit of a semiconductor substrate and/or on orientation of liquid crystal molecules.

Independent formation of each of the antistatic element and optical films with adhesive layers may increase manufacturing time and costs, thereby reducing productivity. Use of a conventional antistatic agent in an adhesive layer of a conventional optical film, however, may reduce optical properties, e.g., transparency, of the optical film or may exhibit insufficient antistatic characteristics.

SUMMARY OF THE INVENTION

Example embodiments are therefore directed to an adhesive composition and to an optical member including the same, which substantially overcome one or more of the disadvantages of the related art.

It is therefore a feature of an example embodiment to provide an adhesive composition exhibiting both good antistatic performance and optical properties.

It is another feature of an example embodiment to provide an optical member including an adhesive composition exhibiting both good antistatic performance and optical properties.

At least one of the above and other features and advantages of the present invention may be realized by providing an adhesive composition, including a base polymer, the base polymer including a copolymer having at least one (meth)acrylic ester with a halogen element and at least one (meth)acrylate in a copolymeric unit, and an antistatic agent, the antistatic agent including an ionic compound. The halogen element in the (meth)acrylic ester may be fluorine (F) or chlorine (Cl). The (meth)acrylic ester with the halogen element may be represented by a general formula $H_2C=CR_1—COOR_2$, wherein $R_1$ may be H or $CH_3$ and $R_2$ may be $CH_2CF_3$, $CH_2(CF_2)_2H$, $CH_2(CF_2)_4H$, $CH_2CH_2(CF_2)_6F$, $CH_2CH_22(CF_2)_8F$, $CH_2CH_2(CF_2)_{10}F$, $CH_2CH_2(CF_2)_{12}F$, $CH(CF_3)_2$, $CF(CF_3)_2$, $CH_2CH(OH)CH_2Cl$, $CH_2C_6Br_6$, $CH_2C_6H_3Br_3$, or $CH_2C_6H_4Br_2$.

An amount of the (meth)acrylic ester with halogen element in the base polymer may be about 0.1% by weight to about 15% by weight of a total weight of the base polymer. The (meth)acrylic ester with the halogen element may include one or more of 2,2,2-trifluoroethyl(meth)acrylate; 2,2,3,3-tetrafluoropropyl acrylate; 1H,1H,5H-octafluoropentyl(meth) acrylate; hexafluoro-2-propyl (meth)acrylate; heptafluoro-2-propyl acrylate; 2-(perfluorooctyl)ethyl methacrylate; 2-propenic acid 3,3,4,4,5,5,6,6,7,7,8,8,8-tri decafluorooctylester; 2-propenic acid 3,3,4,4,5,5,6,6,7,7,8,8,9,9,10,10,10-heptadecafluoro octylester; 2-propenic acid 3,3,4,4,5,5,6,6,7,7,8,8,9,9,10,10,11,11,12,12,12-heneicosa fluorododecylester; 2-propenic acid 3,3,4,4,5,5,6,6,7,7,8,8,9,9,10,10,11,11,12,12,13,13,14,14,14-pentacosa fluorotetra decylester; 3-chloro-2-hydroxypropyl methacrylate; pentabromobenzyl acrylate; 2,4,6-tribromobenzyl acrylate; and 2,6-dibromobenzyl acrylate. An amount of the (meth)acrylate in the base polymer may be about 50% by weight to about 99.1% by weight of a total weight of the base polymer. The (meth)acrylate may include one or more of methyl(meth) acrylate; ethyl(meth)acrylate; n-butyl(meth)acrylate; t-butyl (meth)acrylate; isobutyl(meth)acrylate; hexyl(meth)acrylate; 2-ethylhexyl(meth)acrylate; n-octyl(meth)acrylate; isooctyl(meth)acrylate; n-nonyl(meth)acrylate; isononyl (meth)acrylate; n-decyl(meth)acrylate; isodecyl(meth)acrylate; n-dodecyl(meth)acrylate; n-tridecyl(meth)acrylate; n-tetradecyl(meth)acrylate; methoxyethyl(meth)acrylate; ethoxyethyl(meth)acrylate; butoxylethyl(meth)acrylate; cyclohexyl(meth)acrylate; t-butylcyclohexyl(meth)acrylate; phenoxyethyl(meth)acrylate; nonylphenoxy polyethyleneglycol(meth)acrylate; benzyl(meth)acrylate; isobonyl(meth) acrylate; and tetrahydrofurfuryl(meth)acrylate.

The base polymer may further include an additive, the additive including one or more of a sulfonic acid group containing monomer, a phosphate group containing monomer, a cyano group containing monomer, a vinyl ester, an aromatic vinyl compound, a carboxyl group containing monomer, an acid anhydride group monomer, an epoxy group containing monomer, n-acryloyl morpholine and a vinyl ether. The base polymer may have a weight average molecular weight of about 1,000,000 to about 2,000,000 and a glass transition temperature of about $(-100)°$ C. to about $(-5)°$ C. The base polymer may be cross-linked with a gel fraction rate ranging from about 50% to about 80%. The ionic compound in the antistatic agent may include one or more of an imidazolium salt, a pyridinium salt, an alkylammonium salt, an alkylpyrrolidium salt, an alkylphosphonium salt, a nitrogen containing onium salt, a sulfur containing onium salt, and a phosphorus containing salt. An amount of the antistatic agent in the adhesive composition may be about 0.01% by weight to about 5% by weight of a total weight of the adhesive composition.

At least one of the above and other features and advantages of the present invention may be realized by providing an optical member, including an optical sheet and an adhesive layer on the optical sheet, the adhesive layer including a base polymer, the base polymer having a copolymer with at least one (meth)acrylic ester with a halogen element and at least one (meth)acrylate in a copolymeric unit, and an antistatic agent, the antistatic agent including an ionic compound.

DETAILED DESCRIPTION OF THE INVENTION

Japanese Patent Application Nos. 2007-211538 and 2007-211539, both filed on Aug. 14, 2007, in the Japanese Intellectual Property Office, are incorporated by reference herein in their entirety.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together;

both A and C together; both B and C together; and all three of A, B, and C together. Further, these expressions are open-ended, unless expressly designated to the contrary by their combination with the term "consisting of." For example, the expression "at least one of A, B, and C" may also include an nth member, where n is greater than 3, whereas the expression "at least one selected from the group consisting of A, B, and C" does not.

As used herein, the terms "a" and "an" are open terms that may be used in conjunction with singular items or with plural items. For example, the term "an imidazolium salt" may represent a single compound, e.g., 1,3-dimethylimidazolium chloride, or multiple compounds in combination, e.g., 1,3-dimethylimidazolium chloride mixed with 1-butyl-2,3-dimethylimidazolium chloride.

As used herein, molecular weights of polymeric materials are weight average molecular weights, unless otherwise indicated.

Adhesive Composition

An adhesive composition according to example embodiments may include a base polymer and an antistatic agent with an ionic compound. The base polymer may include a copolymer having a first ester, i.e., an acrylic ester with a halogen element and/or a methacrylic ester with a halogen element, and a second ester, i.e., another acrylic ester and/or methacrylic ester. It is noted that hereinafter "an acrylic ester with a halogen element and/or a methacrylic ester with a halogen element" may be referred to as "(meth)acrylic ester with a halogen element." It is further noted that hereinafter "another acrylic ester and/or methacrylic ester" may be referred to as a "(meth)acrylate."

Accordingly, the adhesive composition may include a copolymer having at least one (meth)acrylic ester with a halogen element and at least one (meth)acrylate, and an antistatic agent with an ionic compound. The adhesive composition may exhibit a surface resistance of about $1 \times 10^8$ to $1 \times 10^{13}$ ($\Omega/\square$) when applied to a substrate, e.g., an optical sheet, thereby exhibiting superior antistatic and optical properties.

The Antistatic Agent

The antistatic agent of the adhesive composition may include an ionic compound. An amount of the antistatic agent in the adhesive composition may be about 0.01% by weight to about 5% by weight, e.g., about 0.05 wt % to about 2 wt %, based on a total combined weight of the antistatic agent and the base polymer. When the amount of the antistatic agent is below about 0.01 wt %, the adhesive composition may exhibit insufficient antistatic properties. When the amount of the antistatic agent is from about 0.01 wt % to about 5 wt %, the adhesive composition may exhibit superior antistatic and optical properties, and may have improved productivity, e.g., reduced costs.

The ionic compound may be any suitable ionic compound compatible with organic solvents used in adhesive compositions and capable of maintaining transparency of the adhesive composition. The ionic compound may be selected to impart a surface resistance of about $1 \times 10^{12}$ ($\Omega/\square$) or less to an adhesive layer formed of the adhesive composition and applied to a substrate, e.g., an optical sheet. For example, the ionic compound may include one or more of an imidazolium salt, a pyridinium salt, an alkylammonium salt, an alkylpyrrolidium salt, an alkylphosphonium salt, a nitrogen containing onium salt, a sulfur containing onium salt, and a phosphorus containing salt.

Examples of an imidazolium salt may include one or more of 1,3-dimethylimidazolium chloride; 1-butyl-2,3-dimethylimidazolium chloride; 1-butyl-3-methylimidazolium bromide; 1-butyl-3-methylimidazolium chloride; 1-butyl-3-methylimidazolium methanesulfonate; 1-ethyl-3-methylimidazolium bromide; 1-butyl-1-(3,3,4,4,5,5,6,6,7,7,8,8,8-tridecafluorooctyl)-imidazolium hexafluorophosphate; 1-ethyl-3-methylimidazolium chloride; 1-ethyl-3-methylimidazolium hexafluorophosphate; 1-ethyl-3-methylimidazolim iodide; 1-ethyl-2,3-dimethylimidazolium chloride; 1-methylimidazolium chloride; 1,2,3-trimethylimidazolium methylsulfate; 1-aryl-3-methylimidazolium chloride; 1-methyl-3-(3,3,4,5,5,6,6,7,7,8,8,8-tridecafluorooctyl)-imidazolium hexafluorophosphate; 1-benzyl-3-methylimidazolium chloride; 1-benzyl-3-methylimidazolium hexafluorophosphate; 1-benzyl-3-methylimidazolium tetrafluoroborate, and so forth.

Examples of a pyridinium salt may include one or more of 1-butyl-3-methylpyridinium bromide, 1-butyl-4-methylpyridinium bromide; 1-butyl-4-methylpyridinium chloride; 1-butylpyridinium bromide; 1-butylpyridinium chloride; 1-butylpyridinium hexafluorophosphate; 1-ethylpyridinium bromide; 1-ethylpyridinium chloride, and so forth.

Examples of an alkylammonium salt may include one or more of cyclohexyltrimethylammonium bis(trifluoromethanesulfonyl)imide; tetra-n-butylammonium chloride; tetrabutylammonium bromide; tributylmethylammonium methylsulfate; tetrabutylammonium bis(trifluoromethylsulfonyl)imide; tetraethylammonium trifluoromethanesulfonate; tetrabutylammonium benzoate; tetrabutylammonium methanesulfate; tetrabutylammonium nonafluorobutanesulfonate; tetra-n-butylammonium hexafluorophosphate; tetrabutylammonium trifluoroacetate; tetrahexylammonium tetrafluoroborate; tetrahexylammonium bromide; tetrahexylammonium iodide; tetraoctylammonium chloride; tetraoctylammonium bromide; tetraheptylammonium bromide; tetrapentylammonium bromide; n-hexadecyltrimethylammonium hexafluorophosphate, and so forth.

Examples of an alkylpyrrolidium salt may include one or more of 1-butyl-1-methylpyrrolidium bromide; 1-butyl-1-methylpyrrolidium chloride; 1-butyl-1-methylpyrrolidium tetrafluoroborate, and so forth.

Examples of an alkylphosphonium salt may include one or more of tetrabutylphosphonium bromide; tetrabutylphosphonium chloride; tetrabutylphosphonium tetrafluoroborate; tetrabutylphosphonium methanesulfonate; tetrabutylphosphonium p-toluensulfonate; tributylhexadecyl phosphonium bromide, and so forth.

More specifically, examples of the ionic compound in the antistatic agent may include one or more of 1-butylpyridinium tetrafluoroborate; 1-butylpyridinium hexafluorophosphate; 1-butyl-3-methylpyridinium tetrafluoroborate; 1-butyl-3-methylpyridinium trifluoromethanesulfonate; 1-butyl-3-methylpyridinium bis(trifluoromethanesulfonyl)imide; 1-butyl-3-methylpyridinium bis(pentafluoroethanesulfonyl)imide; 1-hexylpyridinium tetrafluoroborate; 2-methyl-1-pyrrolin tetrafluoroborate; 1-ethyl-2-phenylindol tetrafluoroborate; 1,2-dimethylindol tetrafluoroborate; 1-ethylcarbzole tetrafluoroborate; 1-ethyl-methylimidazolium tetrafluoroborate; 1-ethyl-3-methylimidazolium acetate; 1-ethyl-3-methylimidazolium trifluoroacetate; 1-ethyl-3-methylimidazolium heptafluorobutyrate; 1-ethyl-3-methylimidazolium trifluoromethanesulfonate; 1-ethyl-3-methylimidazolium perfluorobutanesulfonate; 1-ethyl-3-methylimidazolium dicyanamide; 1-ethyl-3-methylimidazolium bis(trifluoromethanesulfonyl)imide; 1-ethyl-3-methylimidazolium bis(pentafluoroethanesulfonyl)imide; 1-ethyl-3-methylimidazolium tris(trifluoromethanesulfonyl)imide; 1-butyl-3-methylimidazolium tetrafluoroborate; 1-butyl-3-methylimidazolium hexafluoroacetate; 1-butyl-3-methylimidazolium trifluoroacetate; 1-butyl-3-heptafluorobutyrate; 1-butyl-3-methylimidazolium trifluoromethanesulfonate; 1-butyl-3-methylimidazolium perfluorobutanesulfonate; 1-butyl-3-methylimidazolium bis(trifluoromethanesulfonyl)imide; 1-hexyl-3-methylimidazolium bromide; 1-hexyl-3-methylimidazolium chloride; 1-hexyl-3-methylimidazolium tetrafluoroborate; 1-hexyl-3-methylimidazolium hexafluorophosphate; 1-hexyl-3-methylimidazolium trifluoromethanesulfonate; 1-octyl-3-methylimidazolium tetrafluoroborate; 1-octyl-3-methylimidazolium hexafluorophosphate; 1-hexyl-2,3-dimethylimidazolium tetrafluoroborate; 1,2-dimethyl-3-propylimidazolium bis(trifluoromethanesulfonyl)imide; 1-methylpyrazolium tetrafluoroborate; 3-methylpyrazolium tetrafluoroborate; tetrahexylammonium bis(trifluoromethanesulfonyl)imide; diallyldimethylammonium tetrafluoroborate; diallyldimethylammonium trifluoromethanesulfonate; diallyldimethylammonium bis(trifluoromethanesulfonyl)imide; diallyldimethylammonium bis(pentafluoroethanesulfonyl)imide; N,N-diethyl-N-methyl-N-(2-methoxyethyl)ammonium tetrafluoroborate; N,N-diethyl-N-methyl-N-(2-methoxyethyl)ammonium trifluoromethanesulfonate; N,N-diethyl-N-methyl-N-(2-methoxyethyl)ammonium bis(trifluoromethanesulfonyl)imide; N,N-diethyl-N-methyl-N-(2-methoxyethyl)ammonium bis(pentafluoroethanesulfonyl)imide; glycidyltrimethylammonium trifluoromethanesulfonate; glycidyltrimethylammonium bis(trifluoromethanesulfonyl)imide; glycidyltrimethylammonium bis(pentafluoroethanesulfonyl)imide; 1-butylpyridinium(trifluoromethanesulfonyl)trifluoroacetamide; 1-butyl-3-methylpyridinium (trifluoromethanesulfonyl)trifluoroacetamide; 1-ethyl-3-methylimidazolium(trifluoromethanesulfonyl)trifluoroacetamide; diallyldimethylammonium (trifluoromethanesulfonyl)trifluoroacetamide; glycidyltrimethylammonium(trifluoromethanesulfonyl)trifluoroacetamide; N,N-dimethyl-N-ethyl-N-propylammonium bis(trifluoromethanesulfonyl)imide; N,N-dimethyl-N-ethyl-N-butylammonium bis(trifluoromethanesulfonyl)imide; N,N-dimethyl-N-ethyl-N-pentylammonium bis(trifluoromethanesulfonyl)imide; N,N-dimethyl-N-ethyl-N-hexylammonium bis(trifluoromethanesulfonyl)imide; N,N-dimethyl-N-ethyl-N-heptylammonium bis(trifluoromethanesulfonyl)imide; N,N-dimethyl-N-ethyl-N-nonylammonium bis(trifluoromethanesulfonyl)imide; N,N-dimethyl-N,N-dipropylammonium bis(trifluoromethanesulfonyl)imide; N,N-dimethyl-N-propyl-N-butylammonium bis(trifluoromethanesulfonyl)imide; N,N-dimethyl-N-propyl-N-pentylammonium bis(trifluoromethanesulfonyl)imide; N,N-dimethyl-N-propyl-N-hexylammonium bis(trifluoromethane sulfonyl)imide; N,N-dimethyl-N-propyl-N-heptylammonium bis(trifluoromethanesulfonyl)imide; N,N-dimethyl-N-butyl-N-hexylammonium bis(trifluoromethanesulfonyl)imide; N,N-dimethyl-N-butyl-N-heptylammonium bis(trifluoromethane sulfonyl)imide; N,N-dimethyl-N-pentyl-N-hexylammonium bis(trifluoromethanesulfonyl)imide; N,N-dimethyl-N,N-dihexylammonium bis(trifluoromethanesulfonyl)imide; trimethylheptylammonium bis(trifluoromethanesulfonyl)imide; N,N-diethyl-N-methyl-N-propylammonium bis(trifluoromethanesulfonyl)imide; N,N-diethyl-N-methyl-N-pentylammonium bis(trifluoromethane sulfonyl)imide; N,N-diethyl-N-methyl-N-heptylammonium bis(trifluoromethanesulfonyl)imide; N,N-diethyl-N-propyl-N-pentylammonium bis(trifluoromethanesulfonyl)imide; triethylpropylammonium bis(trifluoromethanesulfonyl)imide; triethylpentylammonium bis(trifluoromethanesulfonyl)imide; triethylheptylammonium bis(trifluoromethanesulfonyl)imide; N,N-dipropyl-N-methyl-N-ethylammonium bis(trifluoromethane sulfonyl)imide; N,N-dipropyl-N-methyl-N-pentylammonium bis(tri fluoromethanesulfonyl)imide; N,N-dipropyl-N-butyl-N-hexylammonium bis(trifluoromethanesulfonyl)imide; N,N-dipropyl-N,N-dihexylammonium bis(trifluoromethanesulfonyl)imide; N,N-dibutyl-N-methyl-N-pentylammonium bis(trifluoromethane sulfonyl)imide; N,N-dibutyl-N-methyl-N-hexylammonium bis(trifluoromethanesulfonyl)imide; trioctylmethylammonium bis(tri fluoromethanesuofonyl)imide; N-methyl-N-ethyl-N-propyl-N-pentylammonium bis(trifluoromethanesulfonyl)imide, etc.

The Base Polymer

The base polymer of the adhesive composition may include a copolymer prepared by copolymerization of a (meth)acrylic ester with halogen and a (meth)acrylate. The base polymer may be formed by any suitable polymerization method capable of synthesizing an acrylic polymer, e.g., a solution polymerization method, an emulsion polymerization method, a bulk polymerization method, a suspension polymerization method, and so forth.

An amount of the (meth)acrylic ester with halogen in the base polymer may be about 0.1% by weight to about 15% by weight, based on a total weight of the base polymer. If the amount of the (meth)acrylic ester with halogen is less than about 0.1% by weight, the adhesive composition may exhibit insufficient antistatic properties. Use of the (meth)acrylic ester with halogen in the base polymer may improve productivity of the adhesive composition, e.g., in terms of costs. For example, the (meth)acrylic ester with halogen may be represented by a general formula $H_2C=CR_1-COOR_2$, wherein $R_1$ may be H or $CH_3$, and $R_2$ may be one or more of $CH_2CF_3$, $CH_2(CF_2)_2H$, $CH_2(CF_2)_4H$, $CH_2CH_2(CF_2)_6F$, $CH_2CH_2(CF_2)_8F$, $CH_2CH_2(CF_2)_{10}F$, $CH_2CH_2(CF_2)_{12}F$, $CH(CF_3)_2$, $CF(CF_3)_2$, $CH_2CH(OH)CH_2Cl$, $CH_2C_6Br_6$, $CH_2C_6H_3Br_3$ and $CH_2C_6H_4Br_2$.

More specifically, examples of the (meth)acrylic ester with halogen may include one or more of 2,2,2-trifluoroethyl (meth)acrylate; 2,2,3,3-tetrafluoropropyl acrylate; 1H,1H,5H-octafluoropentyl(meth)acrylate; hexafluoro-2-propyl (meth)acrylate; heptafluoro-2-propyl acrylate; 2-(perfluorooctyl)ethyl methacrylate; 2-propenic acid 3,3,4,4,5,5,6,6,7,7,8,8,8-tri decafluorooctylester; 2-propenic acid 3,3,4,4,5,5,6,6,7,7,8,8,9,9,10,10,10-heptadecafluorooctylester; 2-propenic acid 3,3,4,4,5,5,6,6,7,7,8,8,9,9,10,10,11,11,12,12,12-heneicosa fluorododecylester; 2-propenic acid 3,3,4,4,5,5,6,6,7,7,8,8,9,9,10,10,11,11,12,12,13,13,14,14,14-pentacosa fluorotetradecylester; 3-chloro-2-hydroxypropyl methacrylate; pentabromobenzyl acrylate; 2,4,6-tribromobenzyl acrylate; 2,6-dibromobenzyl acrylate, and so forth.

An amount of the (meth)acrylate in the base polymer may be about 50% by weight to about 99.1% by weight, based on a total weight of the base polymer. The (meth)acrylate may be selected to be compatible with the ionic compound and to impart high adhesiveness to the adhesive composition, e.g., n-butyl acrylate.

Examples of the (meth)acrylate may include one or more of methyl(meth)acrylate, ethyl(meth)acrylate, n-butyl(meth)acrylate, t-butyl(meth)acrylate, isobutyl(meth)acrylate, hexyl(meth)acrylate, 2-ethylhexyl(meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-dodecyl(meth)acrylate, n-tridecyl(meth)acrylate, n-tetradecyl(meth)acrylate, methoxyethyl (meth)acrylate, ethoxyethyl(meth)acrylate, butoxyethyl (meth)acrylate, cyclohexyl(meth)acrylate, t-butylcyclohexyl (meth)acrylate, phenoxyethyl(meth)acrylate, nonylphenoxy polyethyleneglycol(meth)acrylate, benzyl(meth)acrylate, isobonyl(meth)acrylate, tetrahydrofurfuryl(meth)acrylate, and so forth.

The base polymer may further include an additive. The additive may be a monomer, and may be polymerized with the base polymer, e.g., the additive may be polymerized with one of the acrylic esters. Examples of additives may include one or more of a component for enhancing cohesion and/or thermal resistance, e.g., a sulfonic acid group containing monomer, a phosphate group containing monomer, a cyano group containing monomer, a vinyl ester, an aromatic vinyl compound, and so forth, a component for enhancing adhesiveness or initiating a cross-linking reaction, e.g., a carboxyl group containing monomer, an acid anhydride group containing monomer, a hydroxyl group containing monomer, an amide group containing monomer, an amino group containing monomer, an epoxy group containing monomer, n-acryloyl morpholine, a vinyl ether, and so forth, etc.

Examples of the sulfonic group containing monomer may include one or more of styrene sulfonic acid, aryl sulfonic acid, 2-(meth)acrylamido-2-methylpropane sulfonic acid, (meth)acrylamidopropane sulfonic acid, sulfopropyl(meth) acrylate, (meth)acryloxynaphthalene sulfonic acid, and so forth. An example of the phosphate group containing monomer may include 2-hydroxyethylacryloyl phosphate. An example of the cyano group containing monomer may include an acrylonitrile. An example of a vinyl ester may be vinyl acetate. An example of an aromatic vinyl compound may be styrene.

Examples of the carboxyl group containing monomer may include one or more of (meth)acrylic acid, carboxyethyl (meth)acrylate, carboxypentyl(meth)acrylate, itaconic acid, maleic acid, fumaric acid, croton acid, 2-carboxyethylacrylate, and so forth. Examples of the acid anhydride group containing monomer may include one or more of maleic anhydride, itaconic anhydride, and so forth. Examples of the hydroxyl group containing monomer may include one or more of 2-hydroxyethyl(meth)acrylate, 2-hydroxypropyl (meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl acrylate, N-methylol (meth)acrylamide, N-ethylol(meth)acrylamide, vinyl alcohol, allyl alcohol, 2-hydroxyethyl vinylether, 4-hydroxybutylvinylether, diethyleneglycol monovinylether, and so forth. Examples of the amide group may include one or more of acrylamide, diethyl acrylamide, and so forth. Examples of the amino group containing monomer may include one or more of N,N-dimethylaminoethyl(meth)acrylate, N,N-dimethylaminopropyl(meth)acrylate, and so forth. Examples of the epoxy group may include one or more of glycidyl(meth) acrylate, arylglycidylether, and so forth. An example of a vinyl ether may include a vinyl ethyl ether.

The base polymer may have a weight average molecular weight of about 1,000,000 to about 2,000,000 in order to provide sufficient adhesiveness to the adhesive composition for forming an adhesive layer of an optical member. The weight average molecular weight of the base polymer may be estimated on a basis of polystyrene conversion via gel-permeation chromatography.

The base polymer may have a glass temperature (Tg) of about 0° C. or less, e.g., about (−100)° C. to about (−5)° C., about (−80)° C. to about (−10)° C., and so forth. When a base polymer having a Tg of about 0° C. or less is mixed with the ionic compound, the adhesive composition may exhibit superior adhesiveness.

A Cross-Linking Agent

The adhesive composition may further include a cross-linking agent. The cross-linking agent may cross-link the base polymer, so thermal resistance of the adhesive composition may be improved. The cross-linking agent may be added to the adhesive composition to initiate a cross-linking reaction, e.g., addition of a compound having functional groups capable of reacting with a carboxyl, a hydroxyl, an amino, an amide, and so forth, of the base polymer, e.g., an acryl polymer. For example, the cross-linking agent may include one or more of an isocyanate compound, an epoxy compound, an aziridine compound, a metal chelate, and so forth. For example, an isocynate compound and/or an epoxy compound may be selected with respect to a desirable cohesiveness degree of the cohesive composition. Any suitable cross-linking method may be used.

Examples of the isocyanate compound may include one or more of an aromatic isocyanate, e.g., tolylene diisocyanate, xylene diisocyanate, and so forth, an alicyclic isocyanate, e.g., isophorone diisocyanate, and an aliphatic isocyanate, e.g., a hexamethylene diisocyanate. More specifically, examples of the isocyanate compound may include one or more of a low aliphatic polyisocyanate, e.g., butylene diisocyanate, hexamethylene diisocyanate, and so forth, an alicylic isocyanate, e.g., cyclopentylene diisocyanate, cyclohexylene diisocyanate, isophorone diisocyanate, and so forth, an aromatic diisocyanate, e.g., 2,4-tolylene diisocyanate, 4,4'-diphenylmethane diisocyanate, xylene diisocyanate, and so forth, and an isocyanate adduct, e.g., trimethylolpropane/tolylene diisocyanate trimer adduct (Coronate L, Nipon Polyurethane Co., Ltd.), trimethylolpropane/hexamethylene diisocyanate trimer adduct (Coronate H L, Nipon Polyurethane Co., Ltd.), an isocyanurate (Coronate H X, Nipon Polyurethane Co., Ltd.), and so forth.

Examples of the epoxy compound may include one or more of N,N,N'N'-tetraglycidyl-m-xylenediamine (TETRAD-X, Mitsubishi Chemical), 1,3-bis(N,N-diglycidylaminomethyl)cyclohexane (TETRAD-C, Mitsubishi Chemical), and so forth.

An amount of the cross-linking agent may be adjusted with respect to a desired balance between the cross-linking agent and the base polymer, e.g., with respect to an optical member to include the adhesive composition. For example, the cross-linking agent may be added to the adhesive composition in an amount of about 0.01 parts by weight to about 5 parts by weight, based on about 100 parts by weight of the base polymer, in order to impart flexibly and/or high thermal resistance to the base polymer by cohesiveness of an acrylic adhesive.

The base polymer of the adhesive composition may have a cross-linking degree of about 50% to about 80% as determined by gel fraction rate in order to improve adhesiveness of the adhesive composition. The gel fraction rate may be estimated by Equation 1 below, $$\text{Gel Fraction Rate} = \frac{\text{Weight after Dipping/Drying}}{\text{Initial Weight}} \times 100\% \quad \text{Equation 1}$$

wherein the initial weight refers to the initial weight of the adhesive composition and the weight after dipping/drying refers to the weight of the adhesive composition after being dipped in ethyl acetate at 25° C. for a day.

Additional Components

The adhesive composition may further include an additive in any suitable form, e.g., powder, particle, and/or foils. Examples of additives may include one or more of a thickener, a surface lubricant, a leveling agent, an antioxidant, a corrosion inhibitor, a light stabilizer, a UV absorber, a polymerization inhibitor, a silane coupling agent, inorganic or organic fillers, metal powder, a pigment, and so forth.

It is noted that if a silane coupling agent is used in the adhesive composition, when the adhesive composition is applied to a substrate, e.g., an optical sheet, chemical bonds may be formed between the silane coupling agent and functional groups on a surface of the substrate. Accordingly, adhesion strength at an interface between a resultant adhesive layer and the substrate may be enhanced. Consequently, even if a thermal expansion coefficient of a substrate to be coated is different from that of an optical sheet, stress may be concentrated at the interface between the adhesive layer and the substrate due to a difference in thermal expansion coefficients therebetween, thereby alleviating stress applied to the optical sheet.

Preparation of the Adhesive Composition

In an example embodiment, the adhesive composition may be prepared as follows. First, different types of monomers, i.e., raw material of the base polymer, may be mixed with an organic solvent having a boiling point of about 120° C. or less, e.g., ethyl acetate, toluene, acetone, a hexane, and/or an alcohol, followed by addition of a polymerization initiator to induce polymerization of the monomers and produce a base polymer. The resultant base polymer may be obtained in a state of a solution dissolved and/or swollen in the organic solvent.

Next, the antistatic agent including the ionic compound may be added to the organic solvent containing the base polymer. The base polymer and antistatic agent may be mixed with the organic solvent to form a first mixture, e.g., a homogeneous mixture.

Next, the first mixture may be mixed with a cross-linking agent to facilitate cross-linking of the base polymer and form a second mixture. An additive, e.g., a silane coupling agent, may be added to the second mixture to complete formation of the adhesive composition. The adhesive composition may be applied to a substrate, followed by drying of the adhesive composition on the substrate to form an adhesive layer on the substrate.

In another example embodiment, different types of monomers, i.e., raw material of the base polymer, may be mixed with an organic solvent having a boiling point of about 120° C. or less, e.g., ethyl acetate, toluene, acetone, a hexane, and an alcohol, and with the antistatic agent to form a first mixture. Next, a polymerization initiator may be added to the first mixture to induce polymerization of the monomers and form a second mixture. The resultant second mixture may include the base polymer in a state of a solution dissolved and/or swollen in the organic solvent.

Next, the second mixture may be mixed with a cross-linking agent to facilitate cross-linking of the base polymer and form a third mixture. An additive, e.g., a silane coupling agent, may be added to the third mixture to complete formation of the adhesive composition. The adhesive composition may be applied to a substrate, followed by drying of the adhesive composition on the substrate to form an adhesive layer on the substrate.

As disclosed above, the antistatic agent may be added to the base polymer after preparing the base polymer, or may be added to the base polymer during preparation thereof. In order to obtain a homogeneous mixture of the antistatic agent and the base polymer, the antistatic agent may be soluble in the organic solvent, e.g., ethyl acetate.

Optical Member

An optical member according to an example embodiment may include an optical sheet and an adhesive layer on the optical sheet. The adhesive layer may be formed of the adhesive composition according to example embodiments described previously.

In particular, the adhesive composition according to example embodiments may be applied to one side, i.e., a surface, or more of the optical sheet to form a coating layer having a thickness of about 3 μm to about 200 μm, e.g., about 10 μm to about 100 μm, followed by drying of the coating layer to form the adhesive layer. For example, the adhesive composition may be applied directly to the optical sheet. In another example, the adhesive composition may be applied to a substrate, e.g., a release liner, and may be transferred from the substrate to the optical sheet. Application and coating of the adhesive composition onto the optical sheet may be performed by any suitable method, e.g., roll coating, gravure coating, reverse coating, roll brushing, spray coating, air-knife coating, die coating, and so forth.

The optical member in example embodiments may be any suitable optical element used in displays, e.g., a polarizer, a phase contrast plate, a brightness enhancement plate, an anti-glare sheet, and so forth. For example, the optical member may include two or more optical layers laminated together to form an optical sheet, e.g., a laminate of a polarizer and a phase contrast plate, two or more phase contrast plates laminated together, a laminate of a polarizer and a brightness enhancement plate or an anti-glare sheet, and so forth.

The adhesive composition formed on the optical sheet may exhibit adhesion strength of about 1 (N/25 mm) to about to 15 (N/25 mm), e.g., 5 (N/25 mm) to about 10 (N/25 mm). An adhesion strength of about 1 (N/25 mm) to about 15 (N/25 mm) may be sufficient to provide adhesion between the adhesion layer and the optical sheet. The adhesion strength may be measured according to JIS (Japan Industry Standard) ZO237. In particular, after leaving an optical member with an adhesive layer at 23° C. under 50% RH atmosphere for 7 days, the optical member is cut to a width of 25 mm. The cut sample is attached to a glass sheet for autoclave treatment at 50° C. and a pressure of 5 kg/cm$^2$ for 20 minutes. Subsequently, using a tensile tester, measurement of adhesiveness, i.e., adhesive strength, of the sample is conducted with a stripping speed of 0.3 m/min at a stripping angle of 180° at 23° C. under 50% RH atmosphere.

The adhesive composition according to example embodiments may include a (meth)acrylic ester containing a halogen element, a (meth)acrylate, and an antistatic agent including an ionic compound, so antistatic and optical properties of the adhesive composition may be improved. In particular, since the halogen element in the (meth)acrylic ester may be highly electronegative, and may facilitate migration of the ionic compound of the antistatic agent into the adhesive layer, antistatic performance of the adhesive composition may be substantially enhanced. Further, since the adhesive composition includes a (meth)acrylate, the adhesive composition may form an adhesive layer having high transparency and ability to prevent contamination and/or corrosion of an optical sheet coated with the adhesive layer, thereby preventing or substantially minimizing deterioration of optical properties of the optical member.

In addition, productivity of the optical member may be substantially enhanced. Also, the adhesive layer formed of the adhesive composition may exhibit sheet resistance of about $1 \times 10^{12}$ (Ω/□), e.g., about $1 \times 10^8$ (Ω/□) to about $1 \times 10^{11}$ (Ω/□), thereby exhibiting excellent antistatic performance. Further, since the weight average molecular weight of the base polymer may be about 1,000,000 to about 2,000,000 with a gel fraction rate of about 50% to 80%, the adhesive composition may form an adhesive layer with enhanced adhesiveness, i.e., sufficient adhesiveness to be applied to the optical member.

EXAMPLES

Example 1

98.49 parts by weight of butylacrylate, 1.0 part by weight of 2-hydroxyethylacrylate, 0.5 parts by weight of trifluoroethyl acrylate, and 120 parts by weight of ethylacetate were placed in a flask equipped with a reflux condenser and an agitator, and were heated to 65° C. under a nitrogen atmosphere to form a first mixture. All weights in Example 1 are based on 100 parts by weight of a total adhesive composition.

Next, 0.04 parts by weight of a polymerization initiator, i.e., AIBN, were added to the first mixture, and the polymerization was allowed to proceed for 6 hours while maintaining a temperature of 65° C. After completing the polymerization, an ionic compound, i.e., 1-hexyl-3-methylimidazolium hexafluorophosphate, was added to the polymerized product in an amount of 0.01 parts by weight to form a second mixture. In order to control viscosity of the second mixture, 280 parts by weight of ethyl acetate was added to complete a copolymer composition solution. The copolymer composition solution was cooled to room temperature and contained a first adhesive composition. A concentration of the adhesive composition in the copolymer composition solution was 20 wt %, and a viscosity of the copolymer composition solution was 4000 mPa·s. A weight average molecular weight of a base polymer was determined by GPC.

Examples 2-12

Each adhesive composition of Examples 2-12 was prepared by a substantially same process as Example 1, with the exception of varying the (meth)acrylic ester with a halogen element, (meth)acrylate, and an ionic compound. Table 1 illustrates components and corresponding mixing ratios used in each of Examples 1-12. It is noted that Table 1 further reports a concentration of each adhesive composition in a respective copolymer composition solution, a viscosity of the copolymer composition solution, and a weight average molecular weight of a respective base polymer in the adhesive composition. All ratios are reported in weight percentages.

TABLE 1

| Constitutional ratio of adhesive composition | | EXAMPLE | | | | | |
|---|---|---|---|---|---|---|---|
| | | 1 | 2 | 3 | 4 | 5 | 6 |
| Base polymer (wt %) | BA | 98.49 | 92.9 | 77 | 82 | 91.95 | 99 |
| | 2EHA | | | 10 | | 5 | |
| | TFEA | 0.5 | | | | 2 | 0.1 |
| | TFEM | | 5 | | | | |
| | HFPA | | | 10 | | | |
| | HFPM | | | | 15 | | |
| | 3CHPM | | | | | | |
| | HEA | 1 | | | 1 | | |
| | 4HBA | | 2 | | | | |
| | AA | | | 1 | | 1 | 0.8 |
| Ionic compound (wt %) | Comp. 1 | 0.01 | | | | 0.05 | 0.1 |
| | Comp. 2 | | 0.1 | | | | |
| | Comp. 3 | | | 2 | | | |
| | Comp. 4 | | | | 2 | | |
| Sum (wt %) | | 100 | 100 | 100 | 100 | 100 | 100 |
| Viscosity (mPa·s) | | 5000 | 4500 | 3000 | 3000 | 4000 | 5000 |
| Concentration of Adhesive Comp. in Solution (wt %) | | 20 | 20 | 20 | 20 | 20 | 20 |
| Weight Avg. M.Wt. of base polymer | | 1,800,000 | 1,600,000 | 1,100,000 | 1,300,000 | 1,400,000 | 1,800,000 |

| Constitutional ratio of adhesive composition | | EXAMPLE | | | | | |
|---|---|---|---|---|---|---|---|
| | | 7 | 8 | 9 | 10 | 11 | 12 |
| Base polymer (wt %) | BA | 93 | 86.3 | 78.2 | 87.3 | 90.2 | 93 |
| | 2EHA | 3 | 4 | 9 | 5 | 2 | |
| | TFEA | 1 | 5 | 10 | | | |
| | TFEM | | | | | | |
| | HFPA | | | | 5 | | |
| | HFPM | | | | | 5 | |
| | 3CHPM | | | | | | 5 |
| | HEA | 2 | | 1 | | 1 | 1 |
| | 4HBA | | 2 | | 1 | | |
| | AA | | 0.7 | 0.8 | 0.7 | 0.8 | |

TABLE 1-continued

| Ionic compound (wt %) | Comp. 1 | 1 | 2 | | | | 1 |
|---|---|---|---|---|---|---|---|
| | Comp. 2 | | | 1 | | | |
| | Comp. 3 | | | | 1 | | |
| | Comp. 4 | | | | | 1 | |
| Sum (wt %) | | 100 | 100 | 100 | 100 | 100 | 100 |
| Viscosity (mPa · s) | | 4000 | 3500 | 3000 | 3500 | 3500 | 4000 |
| Concentration of Adhesive Comp. in Solution (wt %) | | 20 | 20 | 20 | 20 | 20 | 20 |
| Weight Avg. M.Wt. of base polymer | | 1,500,000 | 1,400,000 | 1,200,000 | 1,400,000 | 1,500,000 | 1,400,000 |

BA: butyl acrylate
2EHA: 2-ethylhexyl acrylate
TFEA: trifluoroethyl acrylate
TFEM: trifluoroethyl methacrylate
HFPA: hexafluoro-2-propyl acrylate
HFPM: hexafluoro-2-propyl methacrylate
3CHPM: 3-chloro-2-hydroxypropyl methacrylate
HEA: 2-hydroxylethyl acrylate
4HBA: 4-hydroxybutylacrylate
AA: acrylic acid
Compound 1: 1-hexyl-3-methylimidazolium hexafluorophosphate (made by Tokyo Casei Industries Ltd., Japan)
Compound 2: N-methyl-N-propylpiperidinium bis(trifluoromethane sulfonyl)imide (made by Kanto Chemical Co., Inc., Japan)
Compound 3: 1-ethylpyridinium bromide (made by Tokyo Casei Industries Ltd., Japan)
Compound 4: 1-butyl-3-methylpyridinium trifluoromethanesulfonate (made by Tokyo Casei Industries Ltd., Japan)

Comparative Examples 1-7

Each adhesive composition of Comparative Examples 1-7 was prepared by a substantially same process as Example 1, with the exception of varying the (meth)acrylic ester with a halogen element, (meth)acrylate, and an ionic compound. FIG. 2 illustrates a table of components and corresponding mixing ratios in each of Comparative Examples 1-7. It is noted that Table 2 reports a concentration of each adhesive composition in a respective copolymer composition solution, a viscosity of the copolymer composition solution, and a weight average molecular weight of a respective base polymer in the adhesive composition.

Each of the copolymer composition solution of Examples 1-12 and comparative Examples 1-7, i.e., 100 wt % of copolymer composition solution, was mixed with a trimethylolpropane/tolylene diisocyanate type cross-linking agent B (CORONATE L, Nippon Polyurethane Ind. Co., Ltd., Japan) and 3-glycidoxypropylmethyl diethoxylsilane as a silane coupling agent (Shinetsu Silicone KBM-403, Shin-Etsu Chemical Co., Ltd., Japan) according to mixing ratios listed in Tables 3-4. Each mixture was homogeneously mixed to prepare an adhesive composition in a solution state. The adhesive composition was applied to a PET release film (MRF 38, Mitsubishi Chemical Polyester Film Corp., Japan) to form an adhesive layer with a dry thickness of 25 μm, dried

TABLE 2

| Constitutional ratio of adhesive composition | | COMPARATIVE EXAMPLE | | | | | | |
|---|---|---|---|---|---|---|---|---|
| | | 1 | 2 | 3 | 4 | 5 | 6 | 7 |
| Base polymer (wt %) | BA | 99 | 98.5 | 93 | 79 | 99.1 | 87.2 | 91.5 |
| | 2EHA | | | | 10 | | 10 | 4 |
| | TFEA | | 0.5 | | | | | |
| | TFEM | | | 5 | | | | |
| | HFPA | | | | 10 | | | |
| | HEA | 1 | 1 | | | | | |
| | 4HBA | | | 2 | | | | 2 |
| | AA | | | | 1 | 0.8 | 0.8 | 0.7 |
| Ionic compound (wt %) | Comp. 1 | | | | | 0.1 | | 1.8 |
| | Comp. 2 | | | | | | 1 | |
| Sum (wt %) | | 100 | 100 | 100 | 100 | 100 | 100 | 100 |
| Viscosity (mPa · s) | | 5000 | 5000 | 4500 | 3000 | 5000 | 3000 | 4000 |
| Concentration (%) | | 20 | 20 | 20 | 20 | 20 | 20 | 20 |
| Wt. Avg. M.Wt. of Base Polymer | | 1,800,000 | 1,800,000 | 1,600,000 | 1,100,000 | 1,700,000 | 1,300,000 | 1,400,000 |

BA: butyl acrylate
2EHA: 2-ethylhexylacrylate
TFEA: trifluoroethyl acrylate
TFEM: trifluoroethyl methacrylate
HFPA: hexafluoro-2-propyl acrylate
HEA: 2-hydroxylethyl acrylate
4HBA: 4-hydroxybutyl acrylate
AA: acrylic acid
Compound 1: 1-hexyl-3-methylimidazolium hexafluorophosphate (made by Tokyo Casei Industries, Ltd., Japan)
Compound 2: N-methyl-N-propylpiperidinium bis(trifluoromethanesulfonyl) imide (made by Kanto Chemical Co., Inc., Japan)

at 90° C. for 3 minutes to form an adhesive layer comprising the adhesive composition. The PET release film and the adhesive layer were attached to a polarizer (MLPH, Miguan Imaging) to produce an optical member including an adhesive composition of each of Examples 1-12 and comparative Examples 1-7.

Each fabricated optical member of Examples 1-12 and comparative Examples 1-7 was subjected to a performance test to determine and analyze a variety of properties, i.e., adhesiveness, surface resistance, metal corrosion, light leakage, durability, substrate adhesion, contamination of a substrate to be coated, low temperature stability, rework properties, and the like. Results are reported in Tables 3-4. Tables 3-4 further report concentrations of the adhesive compositions in the solutions, a viscosity of the adhesive compositions, and a gel fraction rate of the adhesive compositions after cross-linking according to Equation 1.

TABLE 3

| | | EXAMPLE | | | | | | |
|---|---|---|---|---|---|---|---|---|
| | | 1 | 2 | 3 | 4 | 5 | 6 | 7 |
| A. adhesive composition (wt %) | | 100 | 100 | 100 | 100 | 100 | 100 | 100 |
| B. cross-linking agent (wt %) | | 0.1 | 0.05 | 1 | 0.1 | 1 | 1.2 | 0.05 |
| C. silane coupling agent (wt %) | | 0.1 | 0.1 | 0.1 | 0.1 | 0.1 | 0.1 | 0.1 |
| Viscosity of adhesive composition (mPa·s) | | 4500 | 4000 | 2500 | 2500 | 3500 | 4500 | 3500 |
| Concentration of adhesive composition in solution (wt %) | | 18 | 18 | 18 | 18 | 18 | 18 | 18 |
| Gel fraction rate of adhesive composition (%) | | 70 | 68 | 75 | 69 | 74 | 76 | 65 |
| Performance test | Surface resistance (Ω/□) | $10^{12}$ | $10^{11}$ | $10^9$ | $10^8$ | $10^{11}$ | $10^{11}$ | $10^{10}$ |
| | Metal corrosion | ○ | ○ | ○ | ○ | ○ | ○ | ○ |
| | Light leakage | ○ | ○ | ○ | ○ | ○ | ○ | ○ |
| | Durability | ○ | ○ | ○ | ○ | ○ | ○ | ○ |
| | Adhesiveness(N/25 mm) | 4 | 5 | 8 | 6 | 6 | 7 | 5 |
| | Substrate adhesion | ○ | ○ | ○ | ○ | ○ | ○ | ○ |
| | Substrate contamination | ○ | ○ | ○ | ○ | ○ | ○ | ○ |
| | Low temperature stability | ○ | ○ | ○ | ○ | ○ | ○ | ○ |
| | Rework properties | ○ | ○ | ○ | ○ | ○ | ○ | ○ |

| | | EXAMPLE | | | | |
|---|---|---|---|---|---|---|
| | | 8 | 9 | 10 | 11 | 12 |
| A. adhesive composition (wt %) | | 100 | 100 | 100 | 100 | 100 |
| B. cross-linking agent (wt %) | | 0.05 | 1.2 | 1.3 | 1.2 | 0.1 |
| C. silane coupling agent (wt %) | | 0.1 | 0.1 | 0.1 | 0.1 | 0.1 |
| Viscosity of adhesive composition (mPa·s) | | 3000 | 2500 | 3000 | 3000 | 3500 |
| Concentration of adhesive composition in solution (wt %) | | 18 | 18 | 18 | 18 | 18 |
| Gel fraction rate of adhesive composition (%) | | 64 | 73 | 73 | 72 | 70 |
| Performance test | Surface resistance (Ω/□) | $10^9$ | $10^9$ | $10^9$ | $10^9$ | $10^9$ |
| | Metal corrosion | ○ | ○ | ○ | ○ | ○ |
| | Light leakage | ○ | ○ | ○ | ○ | ○ |
| | Durability | ○ | ○ | ○ | ○ | ○ |
| | Adhesiveness(N/25 mm) | 4 | 6 | 7 | 4 | 6 |
| | Substrate adhesion | ○ | ○ | ○ | ○ | ○ |
| | Substrate contamination | ○ | ○ | ○ | ○ | ○ |
| | Low temperature stability | ○ | ○ | ○ | ○ | ○ |
| | Rework properties | ○ | ○ | ○ | ○ | ○ |

A: adhesive composition shown in Table 1
B: trimethylolpropane/tolylene diisocyanate (Nippon Polyurethane Industry Co., Ltd., Japan, trade name: CORONATE L)
C: 3-glycidoxypropylmethyl diethoxysilane (Shin-Etsu Chemical Co., Ltd., Japan, trade name: Shinetsu Silicone KBM-403)

TABLE 4

| | COMPARATIVE EXAMPLE | | | | | | |
|---|---|---|---|---|---|---|---|
| | 1 | 2 | 3 | 4 | 5 | 6 | 7 |
| A. adhesive composition (wt %) | 100 | 100 | 100 | 100 | 100 | 100 | 100 |
| B. cross-linking agent (wt %) | 0.1 | 0.1 | 0.05 | 1 | 1.2 | 1.2 | 0.05 |
| C. silane coupling agent (wt %) | 0.1 | 0.1 | 0.1 | 0.1 | 0.1 | 0.1 | 0.1 |
| Viscosity of adhesive composition (mPa·s) | 4500 | 4500 | 4000 | 2500 | 4500 | 2500 | 3500 |
| Concentration of adhesive composition in solution (%) | 18 | 18 | 18 | 18 | 18 | 18 | 18 |
| Gel fraction rate of adhesive composition | 69 | 68 | 66 | 73 | 72 | 74 | 69 |
| Performance test — Surface resistance (Ω/□) | $10^{15}$ | $10^{15}$ | $10^{15}$ | $10^{15}$ | $10^{14}$ | $10^{14}$ | $10^{13}$ |
| Metal corrosion | ○ | ○ | ○ | ○ | ○ | ○ | ○ |
| Light leakage | ○ | ○ | ○ | ○ | ○ | ○ | ○ |
| Durability | ○ | ○ | ○ | ○ | ○ | ○ | ○ |
| Adhesiveness (N/25 mm) | 4 | 4 | 5 | 8 | 7 | 6 | 4 |
| Substrate adhesion | ○ | ○ | ○ | ○ | ○ | ○ | ○ |
| Substrate contamination | ○ | ○ | ○ | ○ | ○ | ○ | ○ |
| Low temperature stability | ○ | ○ | ○ | ○ | ○ | ○ | ○ |
| Rework properties | ○ | ○ | ○ | ○ | ○ | ○ | ○ |

A: adhesive composition shown in Table 2
B: trimethylolpropane/tolylene diisocyanate (Nippon Polyurethane Industry Co., Ltd., Japan, trade name: CORONATE L)
C: 3-glycidoxypropylmethyl diethoxysilane (Shin-Etsu Chemical Co., Ltd., Japan, trade name: Shinetsu Silicone KBM-403)

Performance Tests

Surface resistance: After leaving an optical member with an adhesive layer at 23° C. under 50% RH atmosphere for 7 days, surface resistance of the optical member was measured using a micro-electrometer (available from Kawaguchi Electric Works Co., Ltd., Japan) at 23° C. under 50% RH atmosphere.

Metal corrosion: After leaving an optical member with an adhesive layer at 23° C. under 50% RH atmosphere for 7 days, an aluminum foil was attached to a surface of the adhesive layer and left at 60° C. under 90% RH atmosphere for 2 days, followed by observing the condition of the adhesive layer. No change in the aluminum foil is denoted by an "○" in Tables 3-4, while whitening of the aluminum foil is denoted by an "x" in Tables 3-4.

Light leakage: After leaving an optical member with an adhesive layer at 23° C. under 50% RH atmosphere for 7 days, the optical member was cut into samples having sizes of 120 mm (MD direction of a polarizer)×60 mm and 120 mm (TD direction of a polarizer)×60 mm. The cut samples were attached to both sides of a glass substrate and subjected to autoclave treatment at 50° C. and pressure of 5 kg/cm² for 20 minutes. After leaving the treated glass substrate at 80° C. under normal atmosphere for 120 hours, appearance of the glass substrate was observed. No showing of light leakage is denoted by an "○" in FIGS. 3-4, while light leakage is denoted by an "x" in FIGS. 3-4.

Durability: After leaving an optical member with an adhesive layer at 23° C. under 50% RH atmosphere for 7 days, the optical member was cut into samples having sizes of 120 mm (MD direction of a polarizer)×60 mm. The cut samples were attached to one sides of a glass substrate and subjected to autoclave treatment at 50° C. and pressure of 5 kg/cm² for 20 minutes. After leaving the treated glass substrate at 80° C. under normal atmosphere, followed by leaving the treated glass substrate at 60° C. under 90% RH atmosphere for 120 hours, appearance of the glass substrate was observed. No showing of light leakage is denoted by an "○" in FIGS. 3-4, while light leakage is denoted by an "x" in FIGS. 3-4.

Adhesiveness and substrate adhesion: After leaving an optical member with an adhesive layer at 23° C. under 50% RH atmosphere for 7 days, the optical member was cut to samples having a width of 25 mm. The cut samples were attached to one side of a glass substrate and subjected to autoclave treatment at 50° C. and pressure of 5 kg/cm² for 20 minutes. Adhesiveness of the treated glass substrate was measured using a tensile tester with a stripping speed of 0.3 m/min at a stripping angle of 180° at 23° C. under 50% RH atmosphere according to test method JIS Z0237. A polarizer including unremoved portions of the adhesive layer is denoted by an "○" in FIGS. 3-4, while a polarizer including no portions of the adhesive layer, i.e., the adhesive layer was completely removed, is denoted by an "x".

Contamination of substrate: Before and after measuring the adhesiveness as described above, a contact angle of the glass substrate was determined. When no variation existed in the contact angles before and after the measurement of adhesiveness, the glass substrate was denoted by an "○." If the contact angles were altered before and after the measurement of adhesiveness, the glass was denoted by an "x". Measurement of contact angles was performed according to testing method JIS R3257.

Low temperature stability: After leaving an optical member with an adhesive layer at 23° C. under 50% RH atmosphere for 7 days, the optical member was cut into samples having sizes of 120 mm (MD direction of a polarizer)×60. The cut samples were attached to one side of a glass substrate and subjected to autoclave treatment at 50° C. and a pressure of 5 kg/cm² for 20 minutes. After leaving the treated substrate at (−40)° C. under normal atmosphere for 120 hours, appearance of the glass substrate was observed. No showing of foam, floatation and/or separation of the cut plate or no precipitation is denoted by an "○" in FIGS. 3-4, while a showing of foam, floatation and/or separation of the cut plate and/or precipitation is denoted by an "x".

Rework properties: During the measurement of adhesiveness as described above, stripping conditions were observed. An interface failure between the adhesive layer and the substrate is denoted by an "○" in FIG. 34, while a cohesive failure or DE (electro-deposition) is denoted by an "x".

Referring to Tables 3-4, it can be seen that the optical members including adhesive composition according to Examples 1-12, i.e., adhesive compositions according to example embodiments, exhibited better antistatic properties than the optical members including adhesive composition according to Comparative Examples 1-7, while exhibiting high results of other performance tests. More specifically, referring to Table 3, it was found that the adhesive layers of the optical members according to Examples 1-12 had a surface resistance of $10^{12}$ (Ω/□) or less and, therefore, exhibited superior antistatic properties. Also, all of the optical members according to Examples 1-12 exhibited adhesiveness in a range of 4 (N/25 mm) to 8 (N/25 mm) after aging at room temperature for 7 days. Additionally, the optical members according to Example 1 exhibited superior characteristics in terms of metal corrosion, light leakage, durability, substrate adhesion, substrate contamination, low temperature stability, and rework properties.

On the other hand, referring to Table 4, the optical members of Comparative Examples 1-4, i.e., adhesive compositions lacking an antistatic agent, exhibited a surface resistance of about $10^{15}$(Ω/□), i.e., inferior antistatic properties as compared to optical members according to Examples 1-12. Further, the optical members of Comparative Examples 5-7, i.e., adhesive compositions lacking a (meth)acrylic ester with halogen element, exhibited a surface resistance of about $10^{13}$-$10^{14}$ (Ω/□), i.e., inferior antistatic properties as compared to optical members according to Examples 1-12

From the results described above, it may be understood that the adhesive composition according to example embodiments may effectively form an adhesive layer with superior antistatic performance without deteriorating optical properties of an optical sheet coated with the adhesive layer. Accordingly, an optical member formed with the adhesive composition may exhibit superior antistatic performance without deteriorating optical properties of the optical sheet therein.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An adhesive composition, comprising:
   a base polymer, the base polymer including a copolymer having at least one (meth)acrylic ester with a halogen element and at least one (meth)acrylate in a copolymeric unit; and
   an antistatic agent, the antistatic agent including an ionic compound.

2. The adhesive composition as claimed in claim 1, wherein the halogen element in the (meth)acrylic ester is fluorine (F) or chlorine (Cl).

3. The adhesive composition as claimed in claim 2, wherein the (meth)acrylic ester with the halogen element is represented by a general formula $H_2C=CR_1—COOR_2$,
   wherein $R_1$ is H or $CH_3$ and $R_2$ is $CH_2CF_3$, $CH_2(CF_2)_2H$, $CH_2(CF_2)_4H$, $CH_2CH_2(CF_2)_6F$, $CH_2CH_22(CF_2)_8F$, $CH_2CH_2(CF_2)_{10}F$, $CH_2CH_2(CF_2)_{12}F$, $CH(CF_3)_2$, $CF(CF_3)_2$, $CH_2CH(OH)CH_2Cl$, $CH_2C_6Br_6$, $CH_2C_6H_3Br_3$, or $CH_2C_6H_4Br_2$.

4. The adhesive composition as claimed in claim 1, wherein an amount of the (meth)acrylic ester with halogen element in the base polymer is about 0.1% by weight to about 15% by weight of a total weight of the base polymer.

5. The adhesive composition as claimed in claim 1, wherein the (meth)acrylic ester with the halogen element includes one or more of 2,2,2-trifluoroethyl (meth)acrylate; 2,2,3,3-tetrafluoropropyl acrylate; 1H,1H,5H-octafluoropentyl (meth)acrylate; hexafluoro-2-propyl (meth)acrylate; heptafluoro-2-propyl acrylate; 2-(perfluorooctyl)ethyl methacrylate; 2-propenic acid 3,3,4,4,5,5,6,6,7,7,8,8,8-tri decafluorooctylester; 2-propenic acid 3,3,4,4,5,5,6,6,7,7,8,8,9,9,10,10,10-heptadecafluoro octylester; 2-propenic acid 3,3,4,4,5,5,6,6,7,7,8,8,9,9,10,10,11,11,12,12,12-heneicosa fluorododecylester; 2-propenic acid 3,3,4,4,5,5,6,6, 7,7,8,8,9,9,10,10,11,11,12,12,13,13, 14,14,14-pentacosa fluorotetra decylester; 3-chloro-2-hydroxypropyl methacrylate; pentabromobenzyl acrylate; 2,4,6-tribromobenzyl acrylate; and 2,6-dibromobenzyl acrylate.

6. The adhesive composition as claimed in claim 1, wherein an amount of the (meth)acrylate in the base polymer is about 50% by weight to about 99.1% by weight of a total weight of the base polymer.

7. The adhesive composition as claimed in claim 6, wherein the (meth)acrylate includes one or more of methyl (meth)acrylate; ethyl(meth)acrylate; n-butyl(meth)acrylate; t-butyl(meth)acrylate; isobutyl(meth)acrylate; hexyl(meth)acrylate; 2-ethylhexyl(meth)acrylate; n-octyl(meth)acrylate; isooctyl(meth)acrylate; n-nonyl(meth)acrylate; isononyl (meth)acrylate; n-decyl(meth)acrylate; isodecyl(meth)acrylate; n-dodecyl(meth)acrylate; n-tridecyl(meth)acrylate; n-tetradecyl(meth)acrylate; methoxyethyl(meth)acrylate; ethoxyethyl(meth)acrylate; butoxylethyl(meth)acrylate; cyclohexyl(meth)acrylate; t-butylcyclohexyl(meth)acrylate; phenoxyethyl(meth)acrylate; nonylphenoxy polyethyleneglycol(meth)acrylate; benzyl(meth)acrylate; isobonyl(meth) acrylate; and tetrahydrofurfuryl(meth)acrylate.

8. The adhesive composition as claimed in claim 6, wherein the base polymer may further include an additive, the additive including one or more of a sulfonic acid group containing monomer, a phosphate group containing monomer, a cyano group containing monomer, a vinyl ester, an aromatic vinyl compound, a carboxyl group containing monomer, an acid anhydride group monomer, an epoxy group containing monomer, n-acryloyl morpholine and a vinyl ether.

9. The adhesive composition as claimed in claim 1, wherein the base polymer has a weight average molecular weight of about 1,000,000 to about 2,000,000 and a glass transition temperature of about (−100)° C. to about (−5)° C.

10. The adhesive composition as claimed in claim 9, wherein the base polymer is cross-linked with a gel fraction rate ranging from about 50% to about 80%.

11. The adhesive composition as claimed in claim 1, wherein the ionic compound in the antistatic agent includes one or more of an imidazolium salt, a pyridinium salt, an alkylammonium salt, an alkylpyrrolidium salt, an alkylphosphonium salt, a nitrogen containing onium salt, a sulfur containing onium salt, and a phosphorus containing salt.

12. The adhesive composition as claimed in claim 1, wherein an amount of the antistatic agent in the adhesive composition is about 0.01% by weight to about 5% by weight of a total weight of the adhesive composition.

13. An optical member, comprising:
an optical sheet; and
an adhesive layer on the optical sheet, the adhesive layer including a base polymer, the base polymer including a copolymer having at least one (meth)acrylic ester with a halogen element and at least one (meth)acrylate in a copolymeric unit, and an antistatic agent, the antistatic agent including an ionic compound.

* * * * *